(12) United States Patent
Kajita

(10) Patent No.: US 7,390,241 B2
(45) Date of Patent: Jun. 24, 2008

(54) LINEAR MOTION APPARATUS AND METHOD FOR MANUFACTURING THEREOF

(75) Inventor: Toshiharu Kajita, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/341,436

(22) Filed: Jan. 30, 2006

(65) Prior Publication Data
US 2006/0121833 A1 Jun. 8, 2006

Related U.S. Application Data

(62) Division of application No. 10/465,661, filed on Jun. 20, 2003, now Pat. No. 7,024,958.

(30) Foreign Application Priority Data
Jun. 20, 2002 (JP) ............... P. 2002-179841

(51) Int. Cl.
*B24B 1/00* (2006.01)
(52) U.S. Cl. ............... 451/52; 451/36; 451/113; 74/424.82; 74/424.86
(58) Field of Classification Search ............ 451/36, 451/52, 113; 74/424.82, 424.86
See application file for complete search history.

(56) References Cited

U.S. PATENT DOCUMENTS

| | | | |
|---|---|---|---|
| 2,842,978 A | | 7/1958 | Orner |
| 4,080,011 A | * | 3/1978 | Wilke et al. ............ 384/45 |
| 4,638,548 A | * | 1/1987 | Miller ............ 29/558 |
| 4,760,635 A | * | 8/1988 | Miller ............ 29/558 |
| 4,936,057 A | * | 6/1990 | Rhoades ............ 451/36 |
| 5,251,365 A | * | 10/1993 | Teramachi ............ 29/898.063 |
| 5,988,007 A | | 11/1999 | Nishimura |
| 6,286,383 B1 | | 9/2001 | Shirai et al. |
| 6,446,520 B1 | * | 9/2002 | Nagai et al. ............ 74/89.33 |
| 6,581,489 B2 | | 6/2003 | Ohkubo |
| 6,792,822 B2 | * | 9/2004 | Ninomiya ............ 74/424.82 |
| 6,874,939 B2 | * | 4/2005 | Michioka et al. ............ 384/45 |
| 6,918,937 B2 | * | 7/2005 | Gilmore et al. ............ 51/307 |
| 7,080,571 B2 | * | 7/2006 | Watanabe et al. ............ 74/424.86 |
| 2002/0007600 A1 | * | 1/2002 | Gilmore et al. ............ 51/298 |
| 2002/0023513 A1 | | 2/2002 | Sekiya et al. |

(Continued)

FOREIGN PATENT DOCUMENTS

GB     2382045 A * 5/2003

(Continued)

*Primary Examiner*—M. Rachuba
(74) *Attorney, Agent, or Firm*—Sughrue Mion, PLLC

(57) ABSTRACT

A linear motion apparatus has a guide shaft including a spiral-shaped or linear-shaped rolling element rolling groove, a movable body including a spiral-shaped or linear-shaped rolling element rolling groove opposed to the rolling element rolling groove of the guide shaft, a large number of rolling elements rollably moving along a rolling element rolling passage formed between the rolling element rolling grooves of the guide shaft and movable body and, a rolling element return passage communicating with the rolling element rolling passage, wherein, in the portion of the rolling element rolling groove of the movable body that is adjacent to an open end of a rolling element return passage, an escape portion is formed by abrasive flow machining in such a manner that the grinding depth thereof increases gradually toward the open end of the rolling element return passage.

2 Claims, 6 Drawing Sheets

U.S. PATENT DOCUMENTS

2002/0073794 A1 6/2002 Ohkubo
2003/0196504 A1 10/2003 Watanabe et al.

FOREIGN PATENT DOCUMENTS

| JP | 57-38829 B1 | 8/1982 |
| JP | 59156661 A * | 9/1984 |
| JP | 11-197946 | 7/1999 |
| JP | 2000-158344 | 6/2000 |
| JP | 2001-141019 | 5/2001 |
| JP | 2002-155936 | 5/2002 |

* cited by examiner

LINEAR MOTION APPARATUS AND METHOD FOR MANUFACTURING THEREOF

This is a divisional of application Ser. No. 10/465,661 filed Jun. 20, 2003 now U.S. Pat. No. 7,024,958. The entire disclosure of the prior application, application Ser. No. 10/465,661 is hereby incorporated by reference.

BACKGROUND OF THE INVENTION

1. Field of the Invention

The present invention relates to a linear motion apparatus of a circulation type such as a ball screw, a linear guide and a ball spline and so on.

2. Description of the Related Art

In a machine tool and an injection molding machine, as a mechanism part thereof for converting the rotational movement of a motor or the like into a linear movement, there is used a ball screw. A ball screw of this type includes a screw shaft and a nut to be movably fitted with the outer periphery of the screw shaft. In case where one of the screw shaft and nut is rotated, a large number of balls incorporated into the nut are allowed to roll between two spiral-shaped ball rolling grooves which are respectively formed in the outer peripheral surface of the screw shaft and in the inner peripheral surface of the nut in such a manner that they are opposed to each other. And, the ball screw of this type further includes a ball return member for returning the balls back to their respective initial positions; and, the balls, which have rolled along a ball rolling passage formed between the two ball rolling grooves of the screw shaft and nut, are allowed to return to the initial positions through a ball return passage formed in the ball return member.

Most of the ball return members of this type, generally, can be produced by bending a tubular-shaped member made of metal into a U-like shape. Therefore, in case where the inside diameter of the ball return member is almost equal to the diameter of the ball, the balls are easy to be clogged in the bent portion of the ball return member. In view of this, normally, the ball return member is formed using a tubular-shaped member having an inside diameter about 1.1 to 1.2 times the diameter of the ball.

However, in case where the ball return member is formed by a tubular-shaped member having an inside diameter about 1.1 to 1.2 times the diameter of the ball, there is produced a stepped portion in the boundary portion between the ball return passage and ball rolling passage, which causes a ball clogging phenomenon that the balls moving from the ball return passage into the ball rolling passage are caught by the stepped portion, thereby raising a possibility that the proper operation of the ball screw can be greatly impeded. In order to solve this drawback, in JP-B-57-38829, there is disclosed a ball screw in which, in the portion of the ball rolling groove of the nut that extends over a proper range from the two ends of the ball return member, there is formed an escape portion which increases gradually toward the leading end of the ball return member.

In the ball screw of the above-cited type, the escape portion makes it difficult to cause such a stepped portion as impedes the rolling movements of the balls in the boundary portion between the ball return passage and ball rolling passage, thereby being able to prevent the ball clogging phenomenon from occurring in the boundary portion between the ball return passage and ball rolling passage. However, in this structure, there is still found the following problem. That is, when such escape portion as disclosed in the above-cited publication is going to be formed in the ball rolling groove of the nut using a working machine such as a ball end mill, the setting of the working machine is very complicated and thus provides a high degree of difficulty, which results in an increase in the manufacturing cost of the ball screw.

SUMMARY OF THE INVENTION

The present invention aims at eliminating the drawbacks found in the conventional ball screws. Accordingly, it is an object of the present invention to provide a linear motion apparatus which can prevent the occurrence of the ball clogging phenomenon in the boundary portion between the rolling element rolling passage and rolling element return passage without incurring an increase in the manufacturing cost thereof.

In attaining the above object, according to the present invention, there is provided a linear motion apparatus having: a guide shaft including a spiral-shaped or linear-shaped rolling element rolling groove; a movable body including a spiral-shaped or linear-shaped rolling element rolling groove opposed to the rolling element rolling groove of the guide shaft; a large number of rolling elements rollably moving along a rolling element rolling passage formed between the rolling element rolling grooves of the guide shaft and movable body; and, a rolling element return passage communicating with the rolling element rolling passage, wherein, in the portion of the rolling element rolling groove of the movable body that is adjacent to an open end of a rolling element return passage, an escape portion is formed by abrasive flow machining in such a manner that the grinding depth thereof increases gradually toward the open end of the rolling element return passage. In the above construction, it is preferable that wherein the escape portion is formed so as to prevent from making a stepped portion in the boundary portion between the rolling element return passage and the rolling element rolling passage.

In attaining the above object, according to the present invention, there is provided a method for manufacturing a linear motion apparatus, the method comprising the step of: grinding stepping portions inside a rolling element rolling passage by flowing visco-elastic media mixed with abrasives through the rolling element rolling passage formed between a rolling element rolling groove of a guide shaft of the linear motion apparatus and a rolling element rolling groove of a movable body of the linear motion apparatus opposed to the rolling element rolling groove of the guide shaft. In the above construction, it is preferable that the method further comprises the step of: grinding stepping portions inside a rolling element circulation passage by flowing the visco-elastic media through the rolling element circulation passage formed by connecting a rolling element return passage to the rolling element rolling passage.

According to the present structure, the escape portion with its grinding depth increasing gradually toward the open end of the rolling element return passage can be formed in the rolling element rolling groove of the movable body without using a working machine such as an NC grinding machine, thereby being able to prevent the occurrence of a ball clogging phenomenon in the boundary portion between the rolling element rolling passage and rolling element return passage without incurring an increase in the working cost thereof. Also, since the grinding depth of the escape portion to be formed in the rolling element rolling groove of the movable body is varied gradually to thereby be able to eliminate the need to set the working amount of a working machine according to the working positions thereof, the escape portion can be formed in the rolling element rolling groove of the movable body without increasing the working cost thereof. Further, in case where there is employed a working operation to reciprocate visco-elastic media mixed with abrasives through a rolling element circulation passage, not only in the end portions of the rolling grooves but also in the stepped portion of the circulation passage which is believed to interfere the rolling movements of the reciprocating rolling elements, it is possible to enforce an R forming operation which can prevent the rolling elements from being caught by the stepped portion.

DETAILED DESCRIPTION OF THE PREFERRED EMBODIMENTS

Now, description will be given below of a ball screw according to an embodiment of the present invention with reference to the accompanying drawings.

Figure 1:
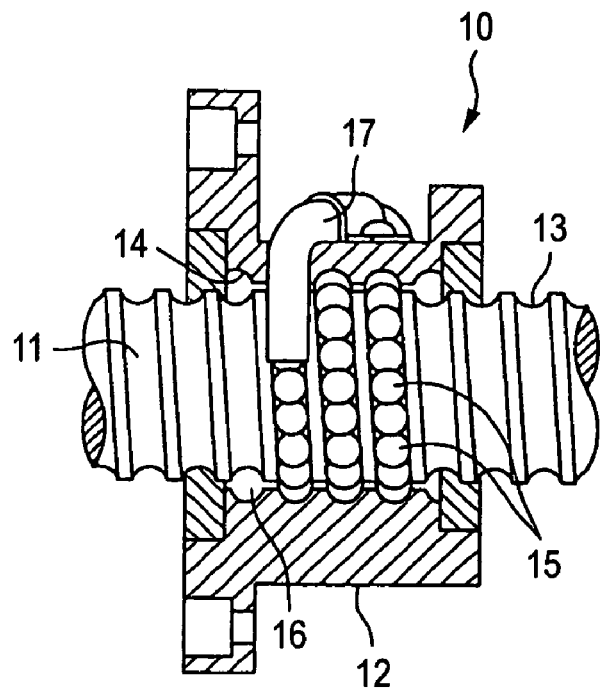
FIG. 1 is a section view of a ball screw according to an embodiment of the present invention, taken along the axial direction thereof.
Figure 2:
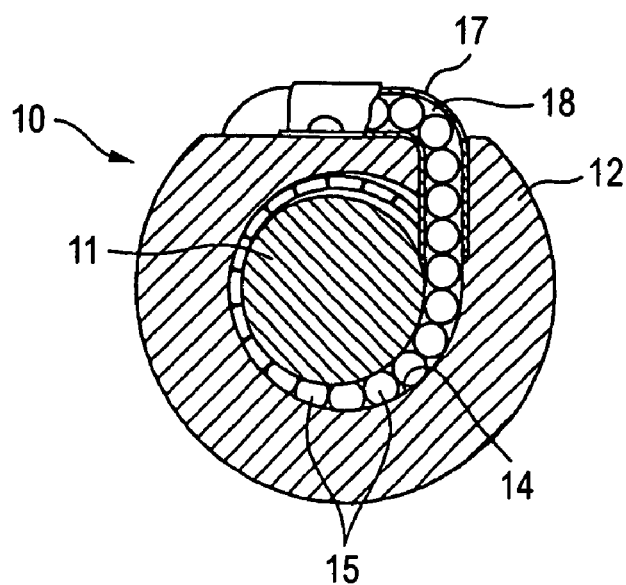
FIG. 2 is a section view of the ball screw shown in FIG. 1, taken along the diameter direction thereof.
Figure 3:
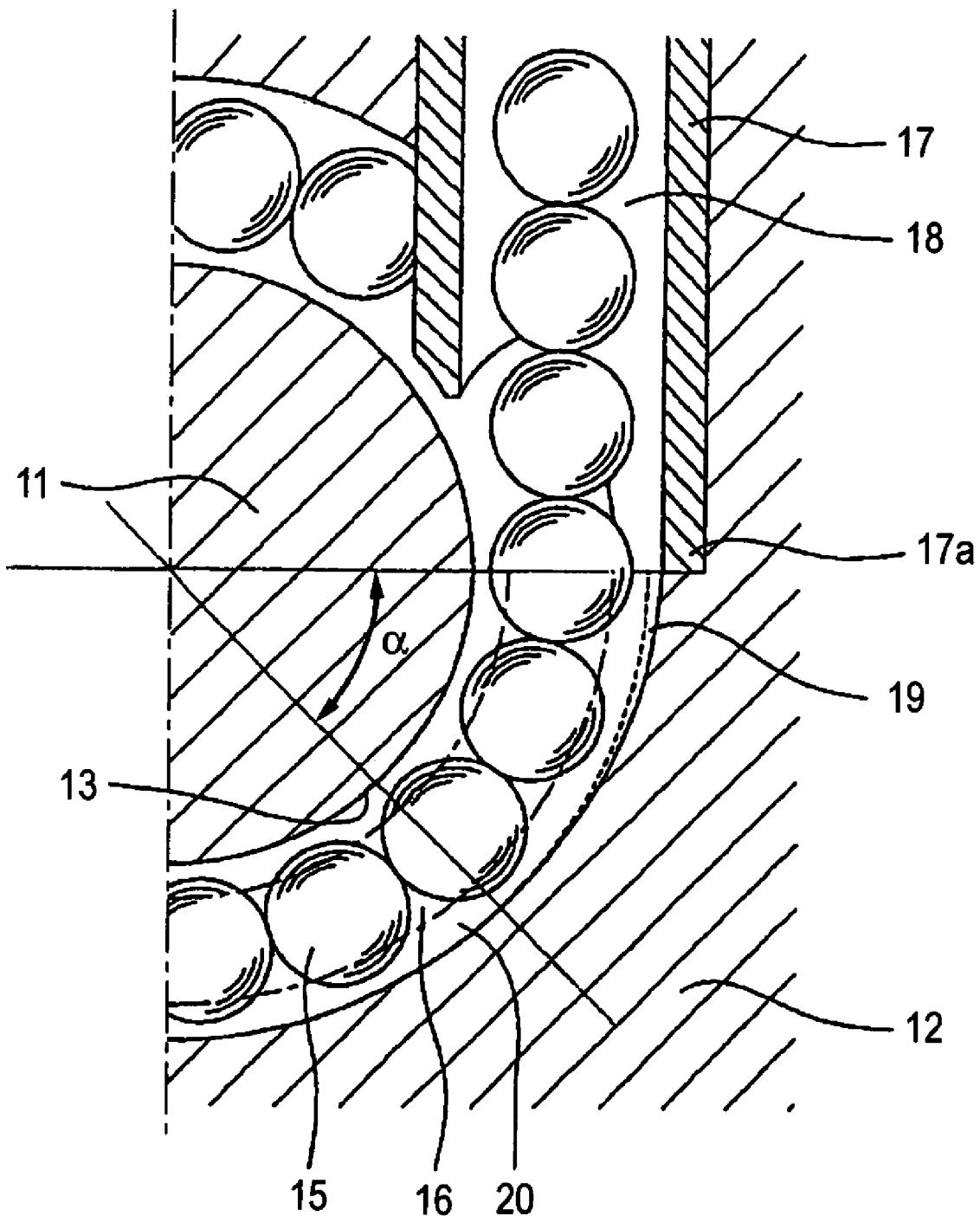
FIG. 3 is a section view of a portion of FIG. 2.

FIGS. 1 to 3 show an embodiment in which the present invention is applied to a ball screw. Specifically, FIG. 1 is a section view of a ball screw according to the embodiment of the present invention, taken along the axial direction of the ball screw, and FIG. 2 is a section view of the ball screw according to the present embodiment, taken along the diameter direction thereof. As shown in FIGS. 1 and 2, the ball screw 10 includes a screw shaft 11 serving as a guide shaft and a nut 12 serving as a movable body which can be movably fitted with the outer periphery of the screw shaft 11; and, in the outer peripheral surface of the screw shaft 11, there is formed a spiral-shaped ball rolling groove 13. This ball rolling groove 13 is disposed opposed to a spiral-shaped ball rolling groove 14 which is formed in the inner peripheral surface of the nut 12. In case where one of the screw shaft 11 and nut 12 is rotated, a large number of balls 15 incorporated into the nut 12 are allowed to roll along a spiral-shaped ball rolling passage 16 formed between the two ball rolling grooves 13, 14.

Also, the ball screw 10 further includes a return tube 17 serving as a ball return member. This return tube 17 is formed by bending a tubular-shaped member having an inside diameter about 1.1-1.2 times the diameter of the ball 15 into a U-like shape. The balls 15, which have rolled along the ball rolling passage 16, are allowed to move into the return tube 17 and are then returned back to their respective initial positions through a ball return passage 18 formed in the return tube 17.

Now, FIG. 3 is a partial section view of the ball screw 10. As shown in FIG. 3, in the ball rolling groove 14 formed in the inner peripheral surface of the nut 12, there is formed an escape portion (a ground portion) 19 so as to extend over a given range from the leading end 17a of the return tube 17.

This escape portion 19 is formed by abrasive flow machining the portion, which is designated by an angle of α, of the ball rolling groove 14; and, the grinding depth of the escape portion 19 is set so as to increase gradually toward the leading end 17a of the return tube 17.

Figure 4A:
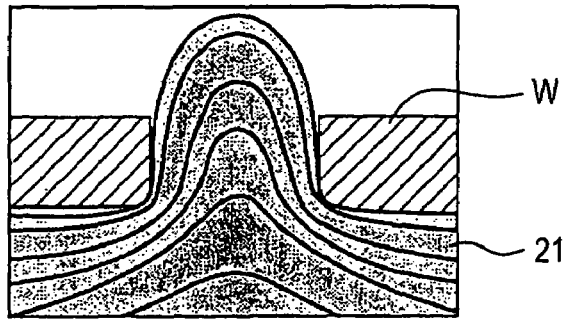
FIGS. 4A to 4C are explanatory views of a method for abrasive flow machining the ball rolling groove of a nut.
Figure 4B:
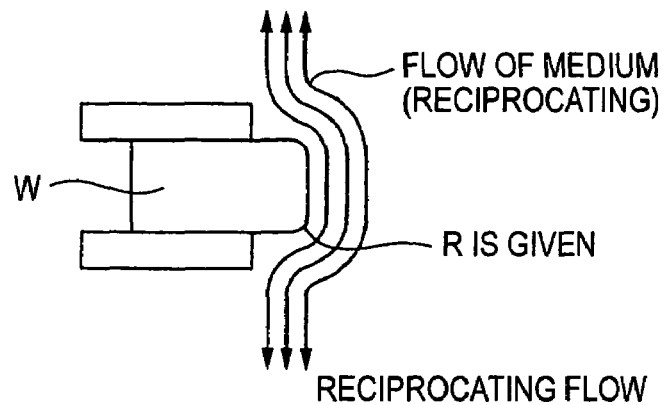
Figure 4C:
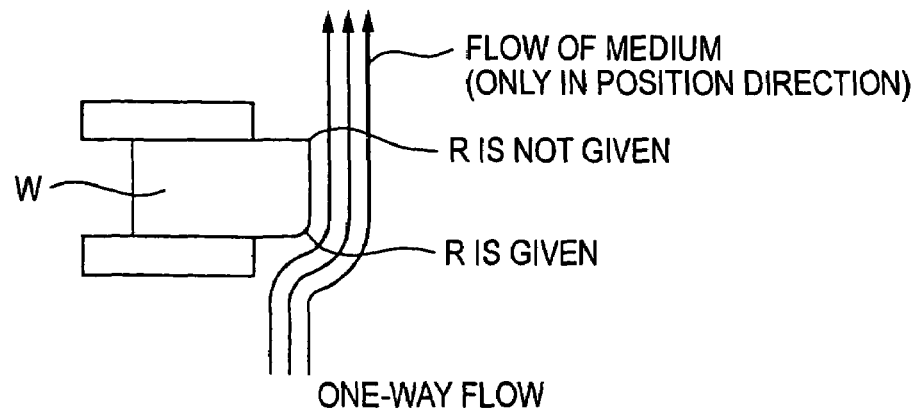

Here, referring to the abrasive flow machining, as shown in FIGS. 4A to 4C, this is a machining method which grinds the surface of a work W using visco-elastic media 21 while applying pressure to abrasives (such as silicon carbide or diamond) mixed into the visco-elastic media 21. In case where the ball rolling groove 14 of the nut 12 is ground over a given range from the leading end 17a of the return tube 17 and the grinding depth thereof is increased gradually toward the leading end 17a of the return tube 17, such a stepped portion as can impede the rolling motion of the ball 15 is difficult to occur in the boundary portion between the ball return passage 18 and ball rolling passage 16.

Figure 5:
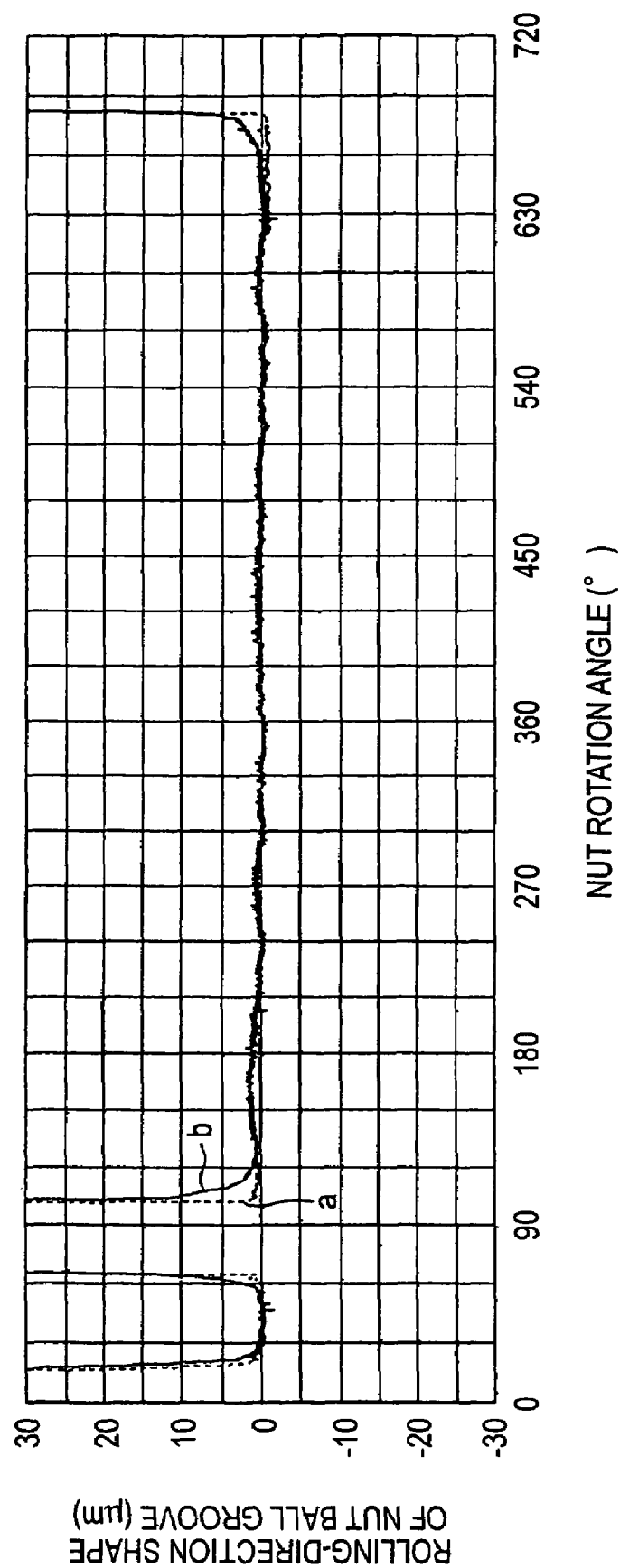
FIG. 5 is a graphical representation of variations in the surface roughness of a ball rolling groove formed in the inner peripheral surface of the nut.

Now, FIG. 5 is a graphical representation of the measured results of the surface roughness of the ball rolling groove 14 before execution of the abrasive flow machining operation and the rolling-direction shapes of the ball rolling groove 14 obtained after execution of the abrasive flow machining operation. In FIG. 5, a solid line a designates the rolling-direction shape of the ball rolling groove 14 before execution of the abrasive flow machining operation, while a solid line b designates the rolling-direction shape of the ball rolling groove 14 after execution of the abrasive flow machining. As can seen clearly from FIG. 5, in case where the abrasive flow machining operation is enforced on the portion of the ball rolling groove 14 that extends over a given range from the leading end 17a of the return tube 17, a smooth crowning-shaped escape portion 19 can be formed in the ball rolling groove 14.

Figure 6:
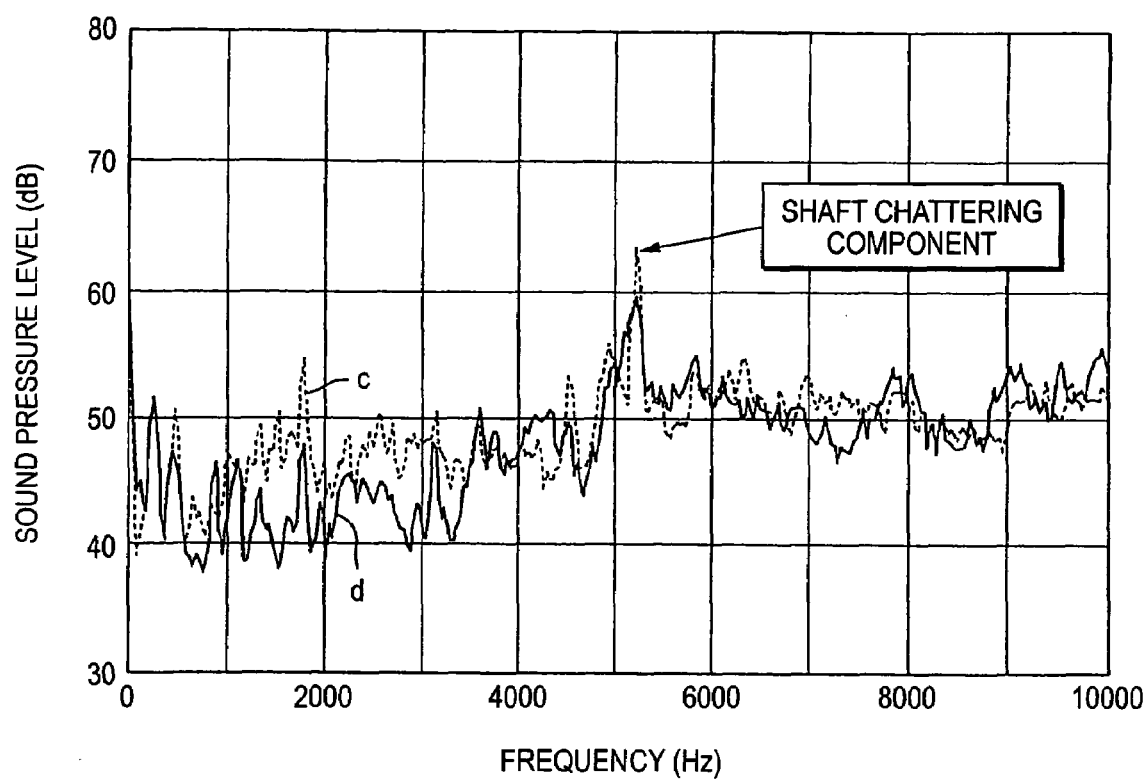
FIG. 6 is a graphical representation of the acoustic characteristic of the ball screw; and, FIGS. 7A and 7B are explanatory views of operation effects obtained in case where a crowning operation is enforced on the ball rolling groove of the nut.

Now, FIG. 6 is a graphical representation of the acoustic characteristic of the ball screw before the ball rolling groove 14 is abrasive flow machined and the acoustic characteristic of the ball screw after the ball rolling groove 14 is abrasive flow machined. In FIG. 6, a solid line c designates the acoustic characteristic of the ball screw before execution of the abrasive flow machining operation on the ball rolling groove 14, while a solid line d designates the acoustic characteristic of the ball screw after execution of the abrasive flow machining operation on the ball rolling groove 14. As can be seen clearly from FIG. 6, in case where the abrasive flow working operation is enforced on the portion of the ball rolling groove 14 that extends over a given range from the leading end 17a of the return tube 17, there can be obtained an effective influence on the generated sound component that is possibly caused by the repeated impacts of the balls 15.

Figure 7A:
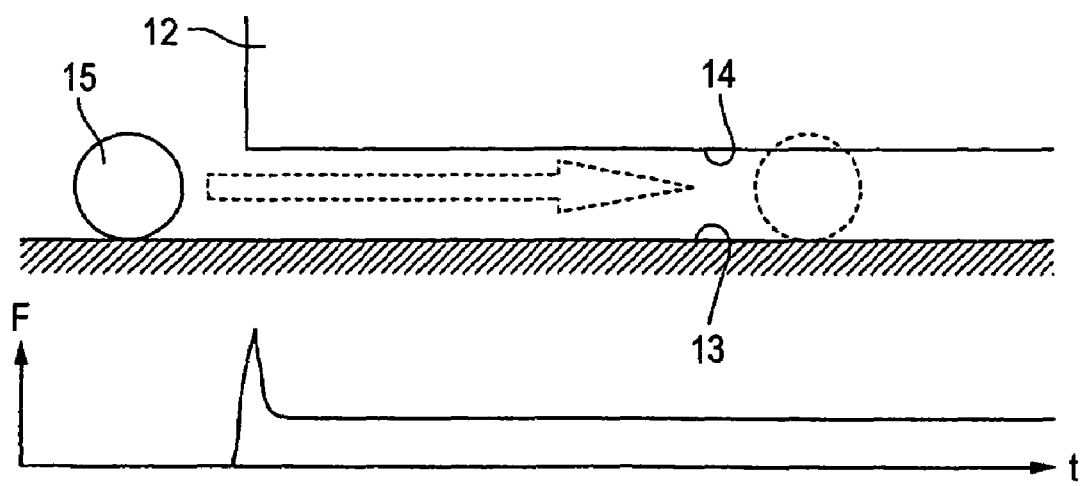
Figure 7B:
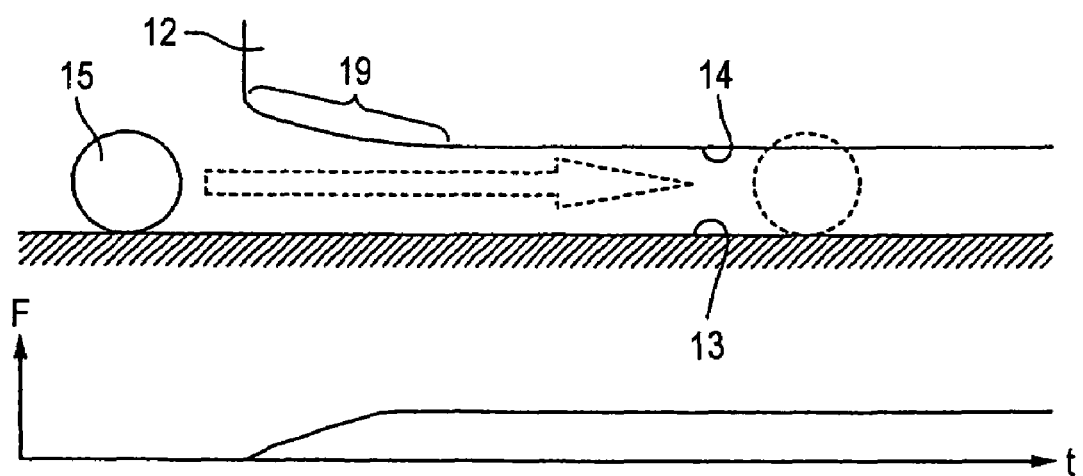

Now, FIGS. 7A and 7B are views to explain the meaning of the crowning operation enforced on the ball rolling groove 14. As shown in FIG. 7A, in case where no crowning operation is enforced on the ball rolling groove 14, the ball 15 with no load applied thereto receives a load suddenly and, therefore, there is generated an impact and thus there is generated an excessive force instantaneously, which results in the generation of vibrations and acoustic sounds.

On the other hand, in case where a crowning operation is enforced on the ball rolling groove 14, as shown in FIG. 7B, a load increases gradually before the ball 15 receives the load steadily and, therefore, there is eliminated the generation of the above-mentioned impact, thereby being able to avoid the cause of generation of the vibrations and acoustic sounds.

As described above, in case where the ball rolling groove 14 of the nut 12 is abrasive flow machined over a given range from the leading end 17a of the return tube 17 and the machining depth of the ball rolling groove 14 is gradually increased toward the leading end 17*a* of the return tube 17, the stepped portion, which can impede the rolling motion of the ball 15, is difficult to occur in the boundary portion between the ball return passage 18 and ball rolling passage 16, thereby being able to prevent the occurrence of the clogging phenomenon of the ball 15 in the boundary portion between the ball return passage 18 and ball rolling passage 16. Also, since the grinding depth of the escape portion 19 formed in the ball rolling groove 14 of the nut 12 is increased gradually toward the leading end 17*a* of the return tube 17, there is eliminated the need to set the working amount of the working machine according to the working position, which makes it possible to form the escape portion 19 in the ball rolling groove 14 of the nut 12 without increasing the working cost thereof.

By the way, the present invention is not limited to the above-mentioned embodiment. For example, in the above embodiment, there is shown a case in which the present invention is applied to a ball screw but it is also possible to apply the present invention to a linear guide and a ball spline as well.

As has been described heretofore, according to the present invention, since the grinding depth of the escape portion to be formed in the rolling element rolling groove of a movable body is increased gradually toward the open end of a rolling element return passage to thereby be able to eliminate the need to set the working amount of a working machine according to the working positions thereof, the escape portion can be formed in the rolling element rolling passage of the movable body without incurring an increase in the working cost thereof.

The invention claimed is:

1. A method for manufacturing a linear motion apparatus, the method comprising the step of:
    grinding stepping portions inside a rolling element rolling passage by flowing visco-elastic media mixed with abrasives through the rolling element rolling passage formed between a rolling element rolling groove of a guide shaft of the linear motion apparatus and a rolling element rolling groove of a movable body of the linear motion apparatus opposed to the rolling element rolling groove of the guide shaft;
    wherein the grinding stepping portions is performed after matching the rolling element rolling groove of the guide shaft to the rolling element rolling groove of the movable body so as to form the rolling element rolling passage.

2. The method for manufacturing the linear motion apparatus as set forth in claim 1, further comprising the step of:
    grinding stepping portions inside a rolling element circulation passage by flowing the visco-elastic media though the rolling element circulation passage formed by connecting a rolling element return passage to the rolling element rolling passage.

* * * * *